US008646473B2

(12) United States Patent
Hall et al.

(10) Patent No.: US 8,646,473 B2
(45) Date of Patent: Feb. 11, 2014

(54) ELECTRO-HYDRAULIC SENSOR FAIL SAFE

(75) Inventors: Derek Scott Hall, Dubuque, IA (US); Joshua Dean Graeve, Peosta, IA (US); Brian K. Kellogg, Bellevue, IA (US); Eric Richard Anderson, Ames, IA (US); Jeffrey William Dobchuk, Saskatoon (CA)

(73) Assignee: Deere & Company, Moline, IL (US)

( * ) Notice: Subject to any disclaimer, the term of this patent is extended or adjusted under 35 U.S.C. 154(b) by 389 days.

(21) Appl. No.: 13/037,347

(22) Filed: Feb. 28, 2011

(65) Prior Publication Data

US 2012/0216877 A1 Aug. 30, 2012

(51) Int. Cl.
*F16K 35/14* (2006.01)
*F16K 31/00* (2006.01)

(52) U.S. Cl.
USPC ........................... 137/14; 137/636; 137/637.1

(58) Field of Classification Search
USPC ..................................... 137/637.1, 636, 14, 1
See application file for complete search history.

(56) References Cited

U.S. PATENT DOCUMENTS

| | | | | |
|---|---|---|---|---|
| 5,784,944 | A | 7/1998 | Tozawa et al. | |
| 6,212,886 | B1 * | 4/2001 | Sugiyama et al. | 60/422 |
| 6,526,747 | B2 * | 3/2003 | Nakatani et al. | 60/399 |
| 6,550,368 | B2 * | 4/2003 | Leeman et al. | 137/637.1 |
| 7,753,078 | B2 * | 7/2010 | Bertolasi et al. | 137/636 |
| 2010/0011757 | A1 | 1/2010 | Satake et al. | |

FOREIGN PATENT DOCUMENTS

| | | | |
|---|---|---|---|
| DE | 69425539 | T2 | 4/2001 |
| DE | 69624899 | T2 | 9/2003 |
| DE | 102007041583 | A1 | 3/2009 |
| JP | 1141207 | A | 6/1989 |

OTHER PUBLICATIONS

German Search Report in Counterpart German Application No. 102012202950.8 (5 pages)(Aug. 16, 2012).

* cited by examiner

*Primary Examiner* — Kevin Lee
(74) *Attorney, Agent, or Firm* — Stephen F. Rost; Taft, Stettinius & Hollister LLP

(57) ABSTRACT

A fail-safe system and method for an electro-hydraulic system. The system includes a controller, sensor, directional control valve, interlock, hydraulic valve and movement actuator. The directional control valve moves when the controller is moved. The interlock is hydraulically coupled to the directional control valve; and is in active position when the directional control valve is moved, and in shutoff position when the directional control valve is not moved. The hydraulic valve has an input side coupled to a flow source and an output side coupled to a hydraulic function. The movement actuator moves the hydraulic valve to a desired position as directed by the controller when the interlock is in the active position, and does not move the hydraulic valve when the interlock is in the shutoff position. The sensor detects movement of the controller and sends a control signal to the first valve actuator.

20 Claims, 1 Drawing Sheet

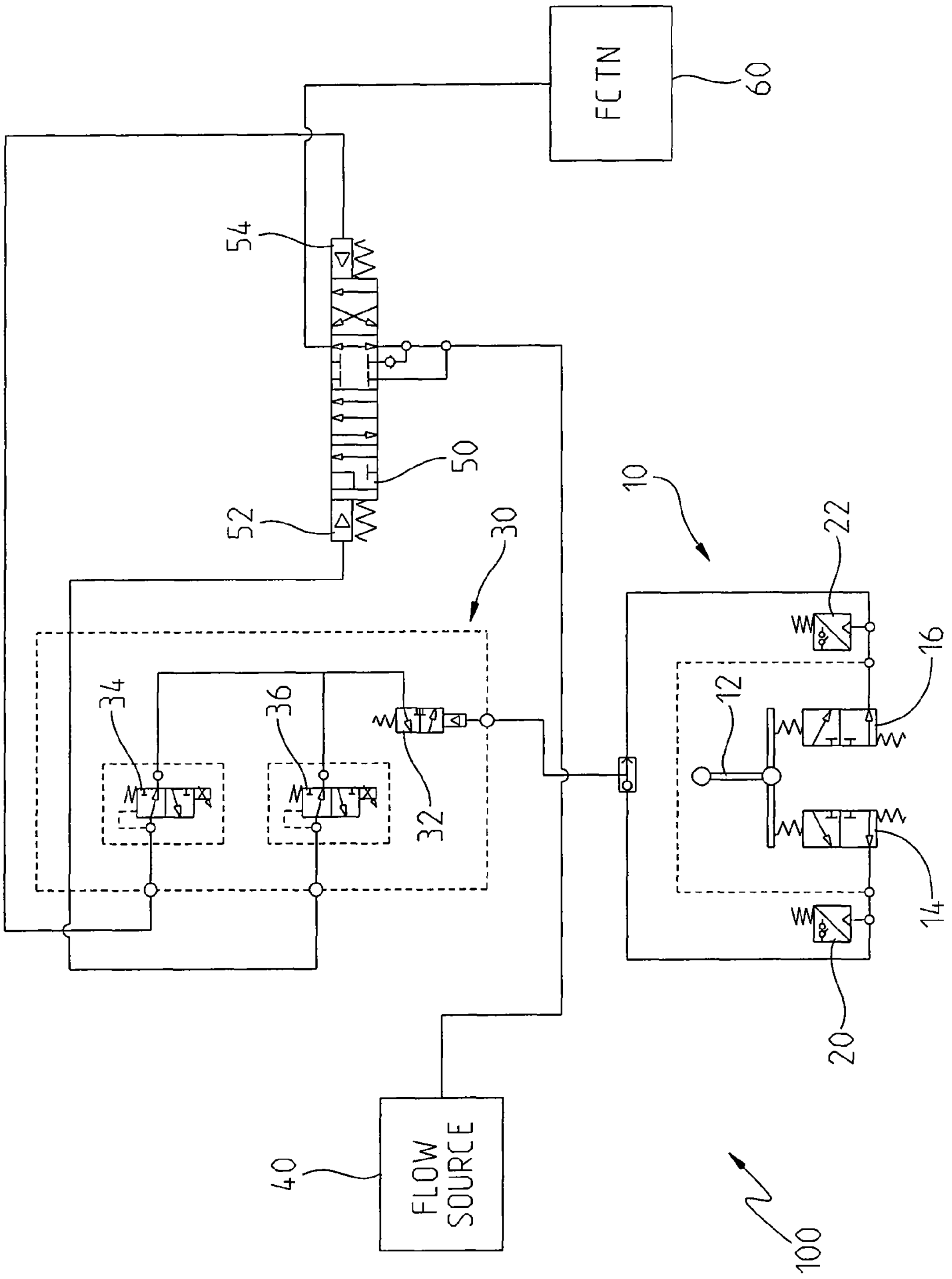
FCTN
60
54
50
52
30
10
22
16
12
34
36
32
14
20
40
FLOW SOURCE
100

ELECTRO-HYDRAULIC SENSOR FAIL SAFE

FIELD OF THE INVENTION

The present invention generally relates to a fail-safe mechanism, and more specifically to a fail-safe mechanism for an electro-hydraulic system.

BACKGROUND OF THE INVENTION

Basic electro-hydraulic systems can have failure modes that require redundancy to avoid conditions that may prevent the operator from being able to stop an activated function. Examples of such failures can include spurious electrical signals from a joystick when the joystick is not moved by the operator, or valves stuck in an open position. It would be desirable to provide a mechanical interlock that prevents valve actuation, without additional layers of redundancy in the electrical system.

SUMMARY

A fail-safe system for an electro-hydraulic system having a flow source and a hydraulic function is disclosed. The fail-safe system includes a pilot controller, a directional control valve, an interlock, a hydraulic valve and a first movement actuator. The directional control valve moves when the pilot controller is moved. The interlock is hydraulically coupled to the directional control valve; and the interlock is positioned in an active position when the directional control valve is moved, and is positioned in a shutoff position when the directional control valve is not moved. The hydraulic valve has an input side coupled to the flow source and an output side coupled to the hydraulic function. The first movement actuator moves the hydraulic valve to a desired position as directed by the pilot controller when the interlock is in the active position, and does not move the hydraulic valve when the interlock is in the shutoff position. The pilot controller can include a joystick and the directional control valve can indicate movement of the joystick.

The fail-safe system can also include a first valve actuator that is coupled to the first movement actuator. The first valve actuator provides flow as directed by the pilot controller to activate the first movement actuator when the interlock is in the active position and does not provide flow to activate the first movement actuator when the interlock is in the shutoff position. The fail-safe system can also include a sensor for detecting movement of the pilot controller, where the sensor sends a control signal to the first valve actuator indicating the movement of the pilot controller. The sensor can be a pressure sensor.

The interlock can include an input and an output, where flow at the interlock input causes flow at the interlock output. When the interlock is positioned in the active position the interlock input can be coupled to pilot pressure causing pilot pressure at the interlock output, and when the interlock is positioned in the shutoff position the interlock input can be coupled to tank so the interlock output provides no pressure. The first valve actuator can include an input coupled to the interlock output and an output coupled to the first movement actuator, where the first valve actuator passes flow from the interlock output to the first movement actuator.

The hydraulic valve can be a spool valve. The fail-safe system can also include a second movement actuator for moving the hydraulic valve to the desired position, a first valve actuator coupled to the first movement actuator, and a second movement actuator coupled to the second movement actuator. The first valve provides flow as directed by the pilot controller to activate the first movement actuator when the interlock is in the active position and does not provide flow to activate the first movement actuator when the interlock is in the shutoff position. The second valve actuator provides flow as directed by the pilot controller to activate the second movement actuator when the interlock is in the active position and does not provide flow to activate the second movement actuator when the interlock is in the shutoff position. The first movement actuator can move the spool valve in one direction and the second movement actuator can move the spool valve in the opposite direction.

A method for a fail-safe system of an electro-hydraulic system having a flow source and a hydraulic function is disclosed. The method includes hydraulically coupling a controller for controlling the hydraulic function to an interlock, hydraulically coupling the interlock to a first valve actuator, hydraulically coupling the first valve actuator to a valve for performing the hydraulic function, sensing movement of the controller with a sensor, sending a control signal to the first valve actuator based on the sensor reading, actuating the first valve actuator based on the sensor reading, actuating the interlock to activate the first valve actuator when the hydraulic coupling indicates movement of the controller, and not actuating the interlock when the hydraulic coupling does not indicate movement of the controller. The controller can be a pilot controller and pilot pressure can hydraulically couple the controller to the interlock. The method can also include hydraulically coupling the first valve actuator to a first movement actuator that is coupled to the valve for performing the hydraulic function. The sensor can be a pressure sensor. The pilot controller can include a joystick and a directional control valve, where the directional control valve is hydraulically coupled to the interlock. Actuating the interlock can include providing pilot pressure from the controller to an input of the interlock, transferring pilot pressure through the interlock, and providing pilot pressure from the interlock to the first valve actuator.

The method can also include hydraulically coupling the interlock to a second valve actuator, hydraulically coupling the second valve actuator to the valve for performing the hydraulic function, sending a control signal to the second valve actuator based on the sensor reading, actuating the second valve actuator based on the sensor reading, and actuating the interlock to activate the second valve actuator when the hydraulic coupling indicates movement of the controller. The method of claim can also include hydraulically coupling the second valve actuator to a second movement actuator that is coupled to the valve for performing the hydraulic function. The valve can be a spool valve. The first movement actuator can move the spool valve in one direction and the second movement actuator can move the spool valve in the opposite direction.

BRIEF DESCRIPTION OF THE DRAWINGS

The FIGURE shows an electro-hydraulic system including an exemplary embodiment of a sensor fail-safe mechanism.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

The FIGURE shows an exemplary embodiment of an electro-hydraulic system 100 with a fail-safe mechanism. The system 100 includes a pilot controller 10, a spool actuator system 30 and a spool valve 50. The pilot controller 10 includes a joystick 12 and two directional control valves 14, 16. Two pressure sensors 20, 22 are coupled to the pilot controller to detect the operator input provided through movement of the joystick 12 of the pilot controller 10. The spool actuator system 30 includes a pilot operated two-position, 3-way valve or interlock valve 32, and two electrically actuated proportional pressure reducing valves 34, 36. The spool actuator system 30 could include more or less than two pressure reducing valves. The spool valve 50 includes movement actuators 52, 54 on either side of the spool valve 50 that move the spool valve 50 to a desired position. The spool valve 50 of the system 100 also includes an input side (bottom) coupled to a flow source 40, for example a pump, and an output side (top) coupled to a hydraulic function 60, for example a cylinder that moves a boom or a bucket.

The signals from the pressure sensors 20, 22 are used to control the pressure reducing valves 34, 36. The interlock valve 32 has a hydraulic input and a hydraulic output, and the interlock valve 32 is actuated by pressure from the pilot controller 10. Movement of the joystick 12 moves the directional control valves 14, 16 of the pilot controller 10 which provides pressure actuating the interlock valve 32. When the interlock valve 32 is actuated, or is in an active position, the input of the interlock valve 32 is coupled to pilot pressure and the interlock valve 32 provides pilot pressure at its output. When the directional control valves 14, 16 of the pilot controller 10 are not moved, the interlock valve 32 is not actuated, or is in a shutoff position, and no pressure is provided at the output of the interlock valve 32.

If the pilot controller 10 is not moved, but there is a failure of the pressure sensors 14, 16 within range, the lack of pressure from the pilot controller 10 to actuate the interlock valve 32 prevents pressure from being supplied to the pressure reducing valves 34, 36. The hydraulic supply of the interlock valve 32 that is fed to the pressure reducing valves 34, 36 can be provided by a mechanical pressure reducing valve elsewhere in the system providing a constant pressure that can be utilized by the electro-hydraulic proportional pressure reducing valves 34, 36.

The inputs of the pressure reducing valves 34, 36 are coupled to the output of the interlock valve 32. Thus, when the interlock valve 32 is actuated via the pilot controller 10, the input of the interlock valve 32 is coupled to pilot pressure and the interlock valve 32 passes pilot pressure to the inputs of the pressure reducing valves 34, 36. When the pilot controller 10 is not moved, the input of the interlock valve 32 is coupled to tank and no flow passes to the inputs of the pressure reducing valves 34, 36. The outputs of the pressure reducing valves 34, 36 are coupled to the movement actuators 52, 54 on either side of the spool valve 50.

Movement of the joystick 12 of the pilot controller 10 actuates the interlock valve 32, and generates a pressure signal to the pressure sensors 20, 22. Actuation of the interlock valve 32 puts the interlock valve in the active position which couples pilot pressure to the input of the interlock valve 32 and the pilot pressure passes through the pressure reducing valves 34, 36 to the movement actuators 52, 54. The pilot pressure through the proportional pressure reducing valves 34, 36 activates the movement actuators 52, 54 to move the spool valve 50 to a desired position as controlled by the operator using the joystick 12 of the pilot controller 10.

If the directional control valves 14, 16 of the pilot controller 10 are not moved; then the interlock valve 32 is not actuated and not connected to pilot pressure. When the interlock valve 32 is not actuated, or is in the shutoff position, no flow pressure passes through the proportional pressure reducing valves 34, 36 and the movement actuators 52, 54 are not activated to move the spool valve 50. Thus, if no operator input through the pilot controller 10 is sensed by the directional control valves 14, 16, then there is no pressure to move the spool valve 50.

This fail safe mechanism of the exemplary embodiment 100 can prevent failure modes that could cause spurious movement of the hydraulic functions. For example, if one of the pressure reducing valves 34, 36 becomes stuck then, without movement of the pilot controller 10, the spool valve 50 will not be actuated. Alternatively, if an electrical signal is received by the electronically actuated pressure reducing valves 34, 36 but the directional control valves 14, 16 of the pilot controller 10 are not moved, then again no flow will be passed to actuate the spool valve 50.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A fail-safe system for an electro-hydraulic system having a flow source and a hydraulic function, the fail-safe system comprising:

a pilot controller including a directional control valve, the directional control valve being moved when the pilot controller is moved;

an interlock hydraulically coupled to the directional control valve of the pilot controller, the interlock being positioned in an active position when the directional control valve is moved, and being positioned in a shutoff position when the directional control valve is not moved;

a hydraulic valve having an input side coupled to the flow source and an output side coupled to the hydraulic function; and a first movement actuator for moving the hydraulic valve to a desired position, the first movement actuator moving the hydraulic valve as directed by the pilot controller when the interlock is in the active position, and not moving the hydraulic valve when the interlock is in the shutoff position.

2. The fail-safe system of claim 1, wherein the pilot controller includes a joystick and the directional control valve indicates movement of the joystick.

3. The fail-safe system of claim 1, further comprising:

a first valve actuator coupled to the first movement actuator, the first valve actuator providing flow as directed by the pilot controller to activate the first movement actuator when the interlock is in the active position and not providing flow to activate the first movement actuator when the interlock is in the shutoff position.

4. The fail-safe system of claim 3, further comprising a sensor for detecting movement of the pilot controller, the sensor sending a control signal to the first valve actuator indicating the movement of the pilot controller.

5. The fail-safe system of claim 4, wherein the sensor is a pressure sensor.

6. The fail-safe system of claim 3, wherein the interlock includes an input and an output, flow at the interlock input causing flow at the interlock output, such that when the interlock is positioned in the active position the interlock input is coupled to pilot pressure causing pilot pressure at the interlock output, and when the interlock is positioned in the shutoff position the interlock input is coupled to tank and the interlock output provides no pressure.

7. The fail-safe system of claim 6, wherein the first valve actuator includes an input coupled to the interlock output and an output coupled to the first movement actuator, the first valve actuator passing flow from the interlock output to the first movement actuator.

8. The fail-safe system of claim 1, wherein the hydraulic valve is a spool valve.

9. The fail-safe system of claim 8, further comprising:

a first valve actuator coupled to the first movement actuator, the first valve actuator providing flow as directed by the pilot controller to activate the first movement actuator when the interlock is in the active position and not providing flow to activate the first movement actuator when the interlock is in the shutoff position;

a second movement actuator for moving the hydraulic valve to the desired position; and a second valve actuator coupled to the second movement actuator, the second valve actuator providing flow as directed by the pilot controller to activate the second movement actuator when the interlock is in the active position and not providing flow to activate the second movement actuator when the interlock is in the shutoff position.

10. The fail-safe system of claim 9, wherein the first movement actuator moves the spool valve in one direction and the second movement actuator moves the spool valve in the opposite direction.

11. A method for a fail-safe system of an electro-hydraulic system having a flow source and a hydraulic function, the method comprising:

hydraulically coupling a controller for controlling the hydraulic function to an interlock;

hydraulically coupling the interlock to a first valve actuator;

hydraulically coupling the first valve actuator to a valve for performing the hydraulic function;

sensing movement of the controller with a sensor;

sending a control signal to the first valve actuator based on the sensor reading;

actuating the first valve actuator based on the sensor reading;

actuating the interlock to activate the first valve actuator when the hydraulic coupling indicates movement of the controller; and not actuating the interlock when the hydraulic coupling does not indicate movement of the controller.

12. The method of claim 11, wherein the controller is a pilot controller and pilot pressure hydraulically couples the controller to the interlock.

13. The method of claim 11, further comprising:

hydraulically coupling the first valve actuator to a first movement actuator that is coupled to the valve for performing the hydraulic function.

14. The method of claim 11, wherein the sensor is a pressure sensor.

15. The method of claim 11, wherein the pilot controller includes a joystick and a directional control valve, the directional control valve being hydraulically coupled to the interlock.

16. The method of claim 11, wherein actuating the interlock comprises:

providing pilot pressure from the controller to an input of the interlock; and transferring pilot pressure through the interlock; and providing pilot pressure from the interlock to the first valve actuator.

17. The method of claim 11, further comprising:

hydraulically coupling the interlock to a second valve actuator;

hydraulically coupling the second valve actuator to the valve for performing the hydraulic function;

sending a control signal to the second valve actuator based on the sensor reading;

actuating the second valve actuator based on the sensor reading;

actuating the interlock to activate the second valve actuator when the hydraulic coupling indicates movement of the controller.

18. The method of claim 17, further comprising:

hydraulically coupling the second valve actuator to a second movement actuator that is coupled to the valve for performing the hydraulic function.

19. The method of claim 18, wherein the valve is a spool valve.

20. The method of claim 19, wherein the first movement actuator moves the spool valve in one direction and the second movement actuator moves the spool valve in the opposite direction.

* * * * *